United States Patent
Schulte

(10) Patent No.: US 10,926,509 B2
(45) Date of Patent: Feb. 23, 2021

(54) FLOORBOARD

(71) Applicant: VÄLINGE INNOVATION AB, Viken (SE)

(72) Inventor: Guido Schulte, Rüthen-Meiste (DE)

(73) Assignee: VALINGE INNOVATION AB, Viken (SE)

(*) Notice: Subject to any disclaimer, the term of this patent is extended or adjusted under 35 U.S.C. 154(b) by 0 days.

(21) Appl. No.: 16/556,289

(22) Filed: Aug. 30, 2019

(65) Prior Publication Data

US 2020/0094512 A1 Mar. 26, 2020

Related U.S. Application Data

(63) Continuation of application No. 15/039,504, filed as application No. PCT/DE2014/100398 on Nov. 11, 2014, now Pat. No. 10,442,152.

(30) Foreign Application Priority Data

Nov. 27, 2013 (DE) ...................... 10 2013 113 109.3

(51) Int. Cl.
*B32B 3/08* (2006.01)
*B32B 21/14* (2006.01)
(Continued)

(52) U.S. Cl.
CPC ................. *B32B 3/08* (2013.01); *B32B 3/02* (2013.01); *B32B 3/06* (2013.01); *B32B 3/14* (2013.01);
(Continued)

(58) Field of Classification Search
CPC .... B32B 3/08; B32B 3/06; B32B 3/14; B32B 3/02; B32B 21/14; B32B 21/02;
(Continued)

(56) References Cited

U.S. PATENT DOCUMENTS 2,018,712 A 10/1935 Elmendorf
2,419,614 A 4/1947 Welch
(Continued)

FOREIGN PATENT DOCUMENTS

AU 80284/75 6/1975
AU 2011236087 A1 5/2013
(Continued)

OTHER PUBLICATIONS

U.S. Appl. No. 16/738,334, Hedlund et al.
(Continued)

*Primary Examiner* — Michael Zhang
(74) *Attorney, Agent, or Firm* — Buchanan Ingersoll & Rooney P.C.

(57) ABSTRACT

The invention relates to a floorboard (1, 2) which has a carrier plate (3) having a top-side veneer (4), in particular a wood veneer. The carrier plate (3) and the veneer (4) are connected to each other via a resin (6). There is an edge strip (14, 15) at least on two side edges (12, 13) of the veneer (4). Said edge strip (14, 15) consists of resin (6). Carrier plate (3) and veneer (4) having the resin (6) are hot-compressed to each other. During compressing, pores, cracks, and/or gaps in the veneer (4) are filled with resin (6).

20 Claims, 3 Drawing Sheets

Figure 3A:
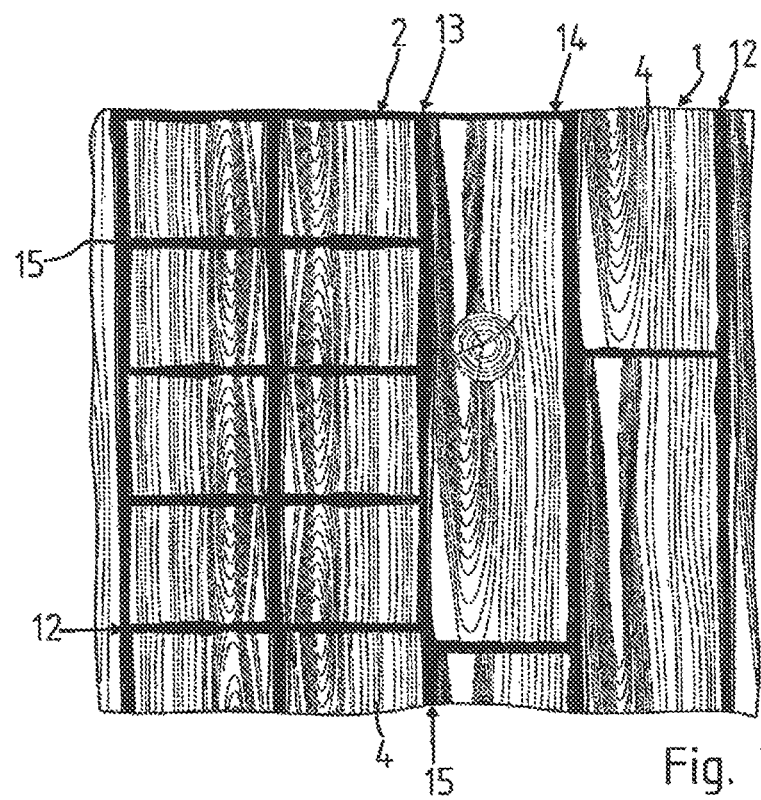

(51) Int. Cl.
*B32B 3/14* (2006.01)
*E04F 15/04* (2006.01)
*B32B 21/08* (2006.01)
*B32B 27/40* (2006.01)
*B32B 3/02* (2006.01)
*B32B 7/05* (2019.01)
*B32B 3/06* (2006.01)
*B32B 7/12* (2006.01)
*B32B 21/02* (2006.01)
*E04F 15/02* (2006.01)
*E04F 15/10* (2006.01)

(52) U.S. Cl.
CPC ............... *B32B 7/05* (2019.01); *B32B 7/12* (2013.01); *B32B 21/02* (2013.01); *B32B 21/08* (2013.01); *B32B 21/14* (2013.01); *B32B 27/40* (2013.01); *E04F 15/02038* (2013.01); *E04F 15/042* (2013.01); *E04F 15/107* (2013.01); *B32B 2260/026* (2013.01); *B32B 2260/046* (2013.01); *B32B 2419/04* (2013.01)

(58) Field of Classification Search
CPC .. B32B 21/08; B32B 7/12; B32B 7/05; B32B 2419/04; B32B 2260/046; B32B 2260/026; B32B 27/40; E04F 15/107; E04F 15/02038; E04F 15/02194; E04F 15/043; E04F 15/045
See application file for complete search history.

(56) References Cited

U.S. PATENT DOCUMENTS

| | | |
|---|---|---|
| 2,587,064 A | 2/1952 | Rapson |
| 2,630,395 A | 3/1953 | McCullough |
| 2,634,534 A | 4/1953 | Brown |
| 2,695,857 A | 11/1954 | Lewis et al. |
| 2,720,478 A | 10/1955 | Hogg |
| 2,831,793 A | 4/1958 | Elmendorf |
| 2,831,794 A | 4/1958 | Elmendorf |
| 2,932,596 A | 4/1960 | Rayner |
| 2,962,081 A | 11/1960 | Dobry et al. |
| 2,992,152 A | 7/1961 | Chapman |
| 3,032,820 A | 5/1962 | Johnson |
| 3,135,643 A | 6/1964 | Michl |
| 3,286,006 A | 11/1966 | Annand |
| 3,308,013 A | 3/1967 | Bryant |
| 3,325,302 A | 6/1967 | Hosfeld |
| 3,342,621 A | 9/1967 | Point et al. |
| 3,345,234 A | 10/1967 | Jecker et al. |
| 3,392,082 A | 7/1968 | Lloyd |
| 3,426,730 A | 2/1969 | Lawson et al. |
| 3,463,653 A | 8/1969 | Letter |
| 3,486,484 A | 12/1969 | Bullough |
| 3,533,725 A | 10/1970 | Bridgeford |
| 3,540,978 A | 11/1970 | Ames |
| 3,565,665 A | 2/1971 | Stranch et al. |
| 3,578,522 A | 5/1971 | Rauch |
| 3,615,279 A | 10/1971 | Ward, Jr. |
| 3,673,020 A | 6/1972 | De Jaeger |
| 3,729,368 A | 4/1973 | Ingham |
| 3,844,863 A | 10/1974 | Forsythe |
| 3,846,219 A | 11/1974 | Kunz |
| 3,880,687 A | 4/1975 | Elmendorf et al. |
| 3,895,984 A | 7/1975 | Cone et al. |
| 3,897,185 A | 7/1975 | Beyer |
| 3,897,588 A | 7/1975 | Nohtomi |
| 3,914,359 A | 10/1975 | Bevan |
| 3,950,599 A | 4/1976 | Board, Jr. |
| 3,956,542 A | 5/1976 | Roberti |
| 3,961,108 A | 6/1976 | Rosner et al. |
| 4,052,739 A | 10/1977 | Wada et al. |
| 4,093,766 A | 6/1978 | Scher et al. |
| 4,115,178 A | 9/1978 | Cone et al. |
| 4,126,725 A | 11/1978 | Shiflet |
| 4,131,705 A | 12/1978 | Kubinsky |
| 4,263,373 A | 4/1981 | McCaskey, Jr. et al. |
| 4,277,527 A | 7/1981 | Duhl |
| 4,311,621 A | 1/1982 | Nishizawa et al. |
| 4,313,857 A | 2/1982 | Blount |
| 4,337,290 A | 6/1982 | Kelly et al. |
| 4,361,612 A | 11/1982 | Shaner |
| 4,420,351 A | 12/1983 | Lussi |
| 4,420,525 A | 12/1983 | Parks |
| 4,430,375 A | 2/1984 | Scher et al. |
| 4,430,380 A | 2/1984 | Hönel |
| 4,474,920 A | 10/1984 | Kyminas et al. |
| 4,743,484 A | 5/1988 | Robbins |
| 4,863,777 A | 9/1989 | Callaway et al. |
| 4,872,825 A | 10/1989 | Ross |
| 4,890,656 A | 1/1990 | Ohsumi et al. |
| 4,911,969 A | 3/1990 | Ogata et al. |
| 4,942,084 A | 7/1990 | Prince |
| 5,034,272 A | 7/1991 | Lindgren et al. |
| 5,059,472 A | 10/1991 | LeBell et al. |
| 5,085,930 A | 2/1992 | Widmann et al. |
| 5,147,486 A | 9/1992 | Hoffman |
| 5,206,066 A | 4/1993 | Horacek |
| 5,246,765 A | 9/1993 | Lussi et al. |
| 5,258,216 A | 11/1993 | Von Bonin et al. |
| 5,292,576 A | 3/1994 | Sanders |
| 5,314,554 A | 5/1994 | Owens |
| 5,354,259 A | 10/1994 | Scholz et al. |
| 5,405,705 A | 4/1995 | Fujimoto |
| 5,422,170 A | 6/1995 | Iwata et al. |
| 5,447,752 A | 9/1995 | Cobb |
| 5,466,511 A | 11/1995 | O'Dell et al. |
| 5,543,193 A | 8/1996 | Tesch |
| 5,569,424 A | 10/1996 | Amour |
| 5,601,930 A | 2/1997 | Mehta et al. |
| 5,604,025 A | 2/1997 | Tesch |
| 5,609,966 A | 3/1997 | Perrin et al. |
| 5,755,068 A * | 5/1998 | Ormiston ................. B32B 3/30 52/314 |
| 5,766,522 A | 6/1998 | Daly et al. |
| 5,827,788 A | 10/1998 | Miyakoshi |
| 5,855,832 A | 1/1999 | Clausi |
| 5,891,564 A | 4/1999 | Schultz et al. |
| 5,925,211 A | 7/1999 | Rakauskas |
| 5,925,296 A | 7/1999 | Leese |
| 5,942,072 A | 8/1999 | McKinnon |
| 5,976,689 A | 11/1999 | Witt et al. |
| 5,985,397 A | 11/1999 | Witt et al. |
| 6,036,137 A | 3/2000 | Myren |
| 6,089,297 A | 7/2000 | Shibagaki et al. |
| 6,103,377 A | 8/2000 | Clausi |
| 6,238,750 B1 | 5/2001 | Correll et al. |
| 6,291,625 B1 * | 9/2001 | Hosgood ................ C08G 18/36 528/74.5 |
| 6,468,645 B1 | 10/2002 | Clausi |
| 6,481,476 B1 | 11/2002 | Okamoto |
| 6,521,326 B1 | 2/2003 | Fischer et al. |
| 6,528,437 B1 | 3/2003 | Hepfinger et al. |
| 6,537,610 B1 | 3/2003 | Springer et al. |
| 6,620,349 B1 | 9/2003 | Lopez |
| 6,667,108 B2 | 12/2003 | Ellstrom |
| 6,769,217 B2 | 8/2004 | Nelson |
| 6,773,799 B1 | 8/2004 | Persson et al. |
| 6,803,110 B2 | 10/2004 | Drees et al. |
| 6,926,954 B2 | 8/2005 | Schuren et al. |
| 6,991,830 B1 | 1/2006 | Hansson et al. |
| 7,022,756 B2 | 4/2006 | Singer |
| 7,485,693 B2 | 2/2009 | Matsuda et al. |
| 7,568,322 B2 | 8/2009 | Pervan |
| 7,811,489 B2 | 10/2010 | Pervan |
| 7,918,062 B2 | 4/2011 | Chen |
| 8,021,741 B2 | 9/2011 | Chen |
| 8,206,534 B2 | 6/2012 | McDuff et al. |
| 8,245,477 B2 | 8/2012 | Pervan |
| 8,302,367 B2 | 11/2012 | Schulte |
| 8,349,234 B2 | 1/2013 | Ziegler et al. |
| 8,349,235 B2 | 1/2013 | Pervan et al. |
| 8,407,963 B2 | 4/2013 | Schulte |

(56) References Cited

U.S. PATENT DOCUMENTS

| | | |
|---|---|---|
| 8,419,877 B2 | 4/2013 | Pervan et al. |
| 8,431,054 B2 | 4/2013 | Pervan et al. |
| 8,480,841 B2 | 7/2013 | Pervan et al. |
| 8,481,111 B2 | 7/2013 | Ziegler et al. |
| 8,499,520 B2 | 8/2013 | Schulte |
| 8,617,439 B2 | 12/2013 | Pervan et al. |
| 8,635,829 B2 | 1/2014 | Schulte |
| 8,650,738 B2 | 2/2014 | Schulte |
| 8,663,785 B2 | 3/2014 | Ziegler et al. |
| 8,728,564 B2 | 5/2014 | Ziegler et al. |
| 8,752,352 B2 | 6/2014 | Schulte |
| 8,784,587 B2 | 7/2014 | Lindgren et al. |
| 8,920,874 B2 | 12/2014 | Ziegler et al. |
| 8,920,876 B2 | 12/2014 | Vetter et al. |
| 8,993,049 B2 | 3/2015 | Pervan |
| 9,085,905 B2 | 7/2015 | Persson et al. |
| 9,109,366 B2 | 8/2015 | Schulte |
| 9,181,698 B2 | 11/2015 | Pervan et al. |
| 9,255,405 B2 | 2/2016 | Pervan et al. |
| 9,296,191 B2 | 3/2016 | Pervan et al. |
| 9,352,499 B2 | 5/2016 | Ziegler et al. |
| 9,403,286 B2 | 8/2016 | Vetter et al. |
| 9,410,319 B2 | 8/2016 | Ziegler et al. |
| 9,556,622 B2 | 1/2017 | Pervan et al. |
| 9,783,996 B2 | 10/2017 | Pervan et al. |
| 10,017,950 B2 | 7/2018 | Pervan |
| 10,100,535 B2 | 10/2018 | Pervan et al. |
| 10,214,913 B2 | 2/2019 | Persson et al. |
| 10,286,633 B2 | 5/2019 | Lundblad et al. |
| 10,315,219 B2 | 6/2019 | Jacobsson |
| 10,344,379 B2 | 7/2019 | Pervan et al. |
| 10,364,578 B2 | 7/2019 | Pervan |
| 10,392,812 B2 | 8/2019 | Pervan |
| 10,442,152 B2 | 10/2019 | Schulte |
| 10,442,164 B2 | 10/2019 | Schulte |
| 10,493,729 B2 | 12/2019 | Pervan et al. |
| 10,513,094 B2 | 12/2019 | Persson et al. |
| 10,800,186 B2 | 10/2020 | Pervan et al. |
| 2001/0006704 A1 | 7/2001 | Chen et al. |
| 2001/0009309 A1 | 7/2001 | Taguchi et al. |
| 2002/0031620 A1 | 3/2002 | Yuzawa et al. |
| 2002/0054994 A1 | 5/2002 | Dupre et al. |
| 2002/0100231 A1 | 8/2002 | Miller |
| 2002/0155297 A1 | 10/2002 | Schuren |
| 2003/0008130 A1 | 1/2003 | Kaneko |
| 2003/0056873 A1 | 3/2003 | Nakos et al. |
| 2003/0059639 A1 | 3/2003 | Worsley |
| 2003/0102094 A1 | 6/2003 | Tirri et al. |
| 2003/0108760 A1 | 6/2003 | Haas et al. |
| 2003/0208980 A1 | 11/2003 | Miller et al. |
| 2004/0035078 A1 | 2/2004 | Pervan |
| 2004/0088946 A1 | 5/2004 | Liang et al. |
| 2004/0123542 A1 | 7/2004 | Grafenauer |
| 2004/0137255 A1 | 7/2004 | Martinez et al. |
| 2004/0191547 A1 | 9/2004 | Oldorff |
| 2004/0202857 A1 | 10/2004 | Singer |
| 2004/0206036 A1 | 10/2004 | Pervan |
| 2004/0237436 A1 | 12/2004 | Zuber et al. |
| 2004/0250911 A1 | 12/2004 | Vogel |
| 2004/0255541 A1 | 12/2004 | Thiers et al. |
| 2005/0003099 A1 | 1/2005 | Quist |
| 2005/0016107 A1 * | 1/2005 | Rosenthal ............... E04F 15/04 52/578 |
| 2005/0079780 A1 | 4/2005 | Rowe et al. |
| 2005/0136234 A1 | 6/2005 | Hak et al. |
| 2005/0153150 A1 | 7/2005 | Wellwood et al. |
| 2005/0166514 A1 | 8/2005 | Pervan |
| 2005/0193677 A1 | 9/2005 | Vogel |
| 2005/0208255 A1 | 9/2005 | Pervan |
| 2005/0227040 A1 | 10/2005 | Toupalik |
| 2005/0252130 A1 | 11/2005 | Martensson |
| 2006/0008630 A1 | 1/2006 | Thiers et al. |
| 2006/0024465 A1 | 2/2006 | Briere |
| 2006/0032175 A1 | 2/2006 | Chen et al. |
| 2006/0048474 A1 | 3/2006 | Pervan et al. |
| 2006/0070321 A1 | 4/2006 | Au |
| 2006/0070325 A1 | 4/2006 | Magnusson |
| 2006/0145384 A1 | 7/2006 | Singer |
| 2006/0154015 A1 | 7/2006 | Miller et al. |
| 2006/0156672 A1 | 7/2006 | Laurent et al. |
| 2006/0172118 A1 | 8/2006 | Han et al. |
| 2006/0183853 A1 | 8/2006 | Sczepan |
| 2007/0055012 A1 | 3/2007 | Caldwell |
| 2007/0066176 A1 | 3/2007 | Wenstrup et al. |
| 2007/0102108 A1 | 5/2007 | Zheng |
| 2007/0125275 A1 | 6/2007 | Bui |
| 2007/0148339 A1 | 6/2007 | Wescott |
| 2007/0166516 A1 | 7/2007 | Kim et al. |
| 2007/0184244 A1 | 8/2007 | Doehring |
| 2007/0207296 A1 | 9/2007 | Eisermann |
| 2007/0218260 A1 | 9/2007 | Miclo et al. |
| 2007/0224438 A1 | 9/2007 | Van Benthem et al. |
| 2007/0256804 A1 | 11/2007 | Garcis Espino et al. |
| 2008/0000179 A1 | 1/2008 | Pervan et al. |
| 2008/0000190 A1 | 1/2008 | Håkansson |
| 2008/0000417 A1 | 1/2008 | Pervan et al. |
| 2008/0032120 A1 | 2/2008 | Braun |
| 2008/0090032 A1 | 4/2008 | Perrin et al. |
| 2008/0093013 A1 | 4/2008 | Muller |
| 2008/0152876 A1 | 6/2008 | Magnusson |
| 2008/0176039 A1 | 7/2008 | Chen et al. |
| 2008/0263985 A1 | 10/2008 | Hasch et al. |
| 2009/0056257 A1 | 3/2009 | Mollinger et al. |
| 2009/0124704 A1 | 5/2009 | Jenkins |
| 2009/0135356 A1 | 5/2009 | Ando |
| 2009/0145066 A1 | 6/2009 | Pervan |
| 2009/0155612 A1 | 6/2009 | Pervan et al. |
| 2009/0165946 A1 | 7/2009 | Suzuki |
| 2009/0208646 A1 | 8/2009 | Kreuder et al. |
| 2009/0311433 A1 | 12/2009 | Wittmann |
| 2010/0092731 A1 | 4/2010 | Pervan et al. |
| 2010/0136303 A1 | 6/2010 | Kreuder |
| 2010/0196678 A1 | 8/2010 | Vermeulen |
| 2010/0223881 A1 | 9/2010 | Kalwa |
| 2010/0239820 A1 | 9/2010 | Buhlmann |
| 2010/0291397 A1 | 11/2010 | Pervan et al. |
| 2010/0300030 A1 | 12/2010 | Pervan et al. |
| 2010/0304089 A1 | 12/2010 | Magnusson |
| 2010/0307675 A1 | 12/2010 | Buhlmann |
| 2010/0307677 A1 | 12/2010 | Buhlmann |
| 2010/0311854 A1 | 12/2010 | Thiers et al. |
| 2010/0314368 A1 | 12/2010 | Groeke |
| 2010/0319282 A1 | 12/2010 | Ruland |
| 2010/0323187 A1 | 12/2010 | Kalwa |
| 2010/0330376 A1 | 12/2010 | Trksak |
| 2011/0175251 A1 | 7/2011 | Ziegler et al. |
| 2011/0177319 A1 | 7/2011 | Ziegler et al. |
| 2011/0177354 A1 | 7/2011 | Ziegler et al. |
| 2011/0189448 A1 | 8/2011 | Lindgren et al. |
| 2011/0247748 A1 | 10/2011 | Pervan et al. |
| 2011/0250404 A1 | 10/2011 | Pervan et al. |
| 2011/0262720 A1 | 10/2011 | Riebel et al. |
| 2011/0274872 A1 | 11/2011 | Yu |
| 2011/0283642 A1 | 11/2011 | Meirlaen et al. |
| 2011/0283650 A1 | 11/2011 | Pervan et al. |
| 2011/0287211 A1 * | 11/2011 | Bailey ............... B27N 3/04 428/99 |
| 2011/0293823 A1 | 12/2011 | Bruderer et al. |
| 2011/0293906 A1 | 12/2011 | Jacobsson |
| 2012/0048487 A1 | 3/2012 | Brewster |
| 2012/0124932 A1 | 5/2012 | Schulte et al. |
| 2012/0263878 A1 | 10/2012 | Ziegler et al. |
| 2012/0263965 A1 * | 10/2012 | Persson ............... E04F 15/04 428/535 |
| 2012/0264853 A1 | 10/2012 | Ziegler et al. |
| 2012/0276348 A1 | 11/2012 | Clausi et al. |
| 2012/0279161 A1 | 11/2012 | Håkansson et al. |
| 2012/0288689 A1 | 11/2012 | Hansson et al. |
| 2012/0308774 A1 | 12/2012 | Persson et al. |
| 2013/0025216 A1 | 1/2013 | Reichwein et al. |
| 2013/0092314 A1 | 4/2013 | Zeigler et al. |
| 2013/0095315 A1 | 4/2013 | Pervan et al. |
| 2013/0111845 A1 | 5/2013 | Pervan et al. |
| 2013/0189534 A1 | 7/2013 | Pervan et al. |

(56) References Cited

U.S. PATENT DOCUMENTS

| | | |
|---|---|---|
| 2013/0196119 A1 | 8/2013 | Dobecz |
| 2013/0269863 A1 | 10/2013 | Pervan et al. |
| 2013/0273244 A1 | 10/2013 | Vetter et al. |
| 2013/0273245 A1 | 10/2013 | Ziegler et al. |
| 2014/0027020 A1 | 1/2014 | Klaeusler et al. |
| 2014/0044872 A1 | 2/2014 | Pervan |
| 2014/0075874 A1 | 3/2014 | Pervan et al. |
| 2014/0147585 A1 | 5/2014 | Smith |
| 2014/0171554 A1 | 6/2014 | Ziegler et al. |
| 2014/0178630 A1 | 6/2014 | Pervan et al. |
| 2014/0186610 A1 | 7/2014 | Pervan |
| 2014/0199558 A1 | 7/2014 | Pervan et al. |
| 2014/0234531 A1 | 8/2014 | Ziegler et al. |
| 2014/0290171 A1 | 10/2014 | Vermeulen |
| 2014/0329064 A1 | 11/2014 | Döhring et al. |
| 2015/0017461 A1 | 1/2015 | Lindgren et al. |
| 2015/0072111 A1 | 3/2015 | Rischer et al. |
| 2015/0079280 A1 | 3/2015 | Vetter et al. |
| 2015/0093502 A1 | 4/2015 | Ziegler et al. |
| 2015/0111055 A1 | 4/2015 | Persson et al. |
| 2015/0118456 A1 | 4/2015 | Carlborg et al. |
| 2015/0159382 A1 | 6/2015 | Pervan |
| 2015/0197942 A1 | 7/2015 | Pervan et al. |
| 2015/0197943 A1 | 7/2015 | Ziegler et al. |
| 2015/0275526 A1 | 10/2015 | Persson et al. |
| 2015/0298433 A1 | 10/2015 | Kalwa |
| 2016/0031189 A1 | 2/2016 | Pervan et al. |
| 2016/0114495 A1 | 4/2016 | Pervan et al. |
| 2016/0186318 A1 | 6/2016 | Pervan et al. |
| 2016/0230400 A9 | 8/2016 | Pervan et al. |
| 2016/0297174 A1 | 10/2016 | Kim |
| 2016/0322041 A1 | 11/2016 | Kim |
| 2016/0326744 A1 | 11/2016 | Döhring et al. |
| 2016/0368180 A1 | 12/2016 | Ziegler et al. |
| 2016/0369507 A1 | 12/2016 | Pervan et al. |
| 2016/0375674 A1 | 12/2016 | Schulte |
| 2017/0120564 A1 | 5/2017 | Schulte |
| 2017/0165936 A1 | 6/2017 | Schulte |
| 2017/0190156 A1 | 7/2017 | Lundblad et al. |
| 2017/0305119 A1 | 10/2017 | Bergelin et al. |
| 2017/0348984 A1 | 12/2017 | Pervan et al. |
| 2018/0002934 A1 | 1/2018 | Pervan et al. |
| 2018/0291638 A1 | 10/2018 | Pervan |
| 2018/0370278 A1 | 12/2018 | Persson et al. |
| 2019/0010711 A1 | 1/2019 | Pervan et al. |
| 2019/0202178 A1 | 7/2019 | Ziegler |
| 2019/0210329 A1 | 7/2019 | Ziegler et al. |
| 2019/0210330 A1 | 7/2019 | Ziegler et al. |
| 2019/0277039 A1 | 9/2019 | Håkansson et al. |
| 2019/0284821 A1 | 9/2019 | Pervan |
| 2019/0292796 A1 | 9/2019 | Pervan et al. |
| 2019/0338534 A1 | 11/2019 | Pervan |
| 2020/0055287 A1 | 2/2020 | Lundblad et al. |
| 2020/0078825 A1 | 3/2020 | Jacobsson |
| 2020/0079059 A1 | 3/2020 | Schulte |
| 2020/0164622 A1 | 5/2020 | Pervan et al. |
| 2020/0215799 A1 | 7/2020 | Hedlund et al. |
| 2020/0223197 A1 | 7/2020 | Hedlund et al. |

FOREIGN PATENT DOCUMENTS

| | | |
|---|---|---|
| CH | 298894 A | 5/1954 |
| CN | 1709717 A | 12/2005 |
| CN | 102166775 A | 8/2011 |
| CN | 202200608 U | 4/2012 |
| CN | 104084994 A | 10/2014 |
| DE | 1 815 312 A1 | 7/1969 |
| DE | 7148789 U | 4/1972 |
| DE | 29 39 828 A1 | 4/1981 |
| DE | 33 34 921 A1 | 4/1985 |
| DE | 36 34 885 A1 | 4/1988 |
| DE | 42 33 050 A1 | 4/1993 |
| DE | 42 36 266 A1 | 5/1993 |
| DE | 202 14 532 U1 | 2/2004 |
| DE | 102 45 914 A1 | 4/2004 |
| DE | 103 00 247 A1 | 7/2004 |
| DE | 103 31 657 A1 | 2/2005 |
| DE | 20 2006 007 797 U1 | 8/2006 |
| DE | 10 2005 046 264 A1 | 4/2007 |
| DE | 10 2006 024 593 A1 | 12/2007 |
| DE | 10 2006 058 244 A1 | 6/2008 |
| DE | 10 2007 043 202 A1 | 3/2009 |
| DE | 20 2009 008 367 U1 | 9/2009 |
| DE | 10 2010 045 266 A | 3/2012 |
| DE | 20 2013 011 776 U1 | 7/2014 |
| DE | 20 2014 102 031 U1 | 7/2014 |
| DE | 20 2013 012 020 U1 | 2/2015 |
| DE | 10 2013 113 125 A1 | 5/2015 |
| EP | 0 129 430 A2 | 12/1984 |
| EP | 0 234 220 A2 | 9/1987 |
| EP | 0 129 430 B1 | 1/1990 |
| EP | 0 355 829 A2 | 2/1990 |
| EP | 0 592 013 A2 | 4/1994 |
| EP | 0 611 408 A1 | 8/1994 |
| EP | 0 656 443 A1 | 6/1995 |
| EP | 0 611 408 B1 | 9/1996 |
| EP | 0 732 449 A1 | 9/1996 |
| EP | 0 744 477 A2 | 11/1996 |
| EP | 0 914 914 A2 | 5/1999 |
| EP | 0 732 449 B1 | 8/1999 |
| EP | 0 744 477 B1 | 1/2000 |
| EP | 0 993 934 A2 | 4/2000 |
| EP | 1 035 255 A1 | 9/2000 |
| EP | 1 125 971 A1 | 8/2001 |
| EP | 1 136 251 A2 | 9/2001 |
| EP | 1 209 199 A1 | 5/2002 |
| EP | 1 249 322 A1 | 10/2002 |
| EP | 1 262 607 A1 | 12/2002 |
| EP | 1 454 763 A2 | 9/2004 |
| EP | 1 242 702 B1 | 11/2004 |
| EP | 1 498 241 A2 | 1/2005 |
| EP | 1 584 378 A1 | 10/2005 |
| EP | 1 657 055 A1 | 5/2006 |
| EP | 1 681 103 A2 | 7/2006 |
| EP | 1 690 603 A1 | 8/2006 |
| EP | 1 847 385 A1 | 10/2007 |
| EP | 1 961 556 A1 | 8/2008 |
| EP | 1 997 623 A1 | 12/2008 |
| EP | 2 025 484 A1 | 2/2009 |
| EP | 1 454 763 B1 | 8/2009 |
| EP | 2 105 320 A1 | 9/2009 |
| EP | 2 119 550 A1 | 11/2009 |
| EP | 2 246 500 A2 | 11/2010 |
| EP | 2 263 867 A1 | 12/2010 |
| EP | 2 264 259 A2 | 12/2010 |
| EP | 2 272 667 A1 | 1/2011 |
| EP | 2 272 668 A1 | 1/2011 |
| EP | 2 305 462 A1 | 4/2011 |
| EP | 2 353 861 A1 | 8/2011 |
| EP | 1 847 385 B1 | 9/2011 |
| EP | 2 263 867 B1 | 3/2012 |
| EP | 2 902 196 A1 | 8/2015 |
| FR | 801 433 A | 8/1936 |
| FR | 2 873 953 A1 | 2/2006 |
| GB | 785008 | 10/1957 |
| GB | 984 170 A | 2/1965 |
| GB | 1090450 | 11/1967 |
| GB | 1 561 820 A | 3/1980 |
| GB | 2 238 983 A | 6/1991 |
| GB | 2 248 246 A | 4/1992 |
| GB | 2 464 541 A | 4/2010 |
| JP | S51-128409 | 11/1976 |
| JP | S52-087212 A | 7/1977 |
| JP | S53-148506 | 12/1978 |
| JP | S56-049258 A | 5/1981 |
| JP | S56-151564 A | 11/1981 |
| JP | S58-084761 A | 5/1983 |
| JP | S59-101312 A | 6/1984 |
| JP | S64-062108 A | 3/1989 |
| JP | H02-188206 A | 7/1990 |
| JP | H02-198801 A | 8/1990 |
| JP | H02-229002 A | 9/1990 |
| JP | H03-030905 A | 2/1991 |
| JP | H03-211047 A | 9/1991 |

(56) References Cited

FOREIGN PATENT DOCUMENTS

| | | |
|---|---|---|
| JP | H03-267174 A | 11/1991 |
| JP | H04-107101 A | 4/1992 |
| JP | H04-247901 A | 9/1992 |
| JP | H04-269506 A | 9/1992 |
| JP | H05-077362 A | 3/1993 |
| JP | H05-237809 A | 9/1993 |
| JP | H06-312406 A | 11/1994 |
| JP | H07-060704 A | 3/1995 |
| JP | H08-207012 A | 8/1996 |
| JP | H09-164651 A | 6/1997 |
| JP | H10-002098 A | 1/1998 |
| JP | H10-18562 A | 1/1998 |
| JP | H10-086107 A | 4/1998 |
| JP | 2925749 B2 | 7/1999 |
| JP | H11-291203 A | 10/1999 |
| JP | 2000-226931 A | 8/2000 |
| JP | 2000-263520 A | 9/2000 |
| JP | 2001-287208 A | 10/2001 |
| JP | 2001-329681 A | 11/2001 |
| JP | 2003-311717 A | 11/2003 |
| JP | 2003-311718 A | 11/2003 |
| JP | 2004-068512 A | 3/2004 |
| JP | 2004-076476 A | 3/2004 |
| JP | 2005-034815 A | 2/2005 |
| JP | 2005-074682 A | 3/2005 |
| JP | 2005-170016 A | 6/2005 |
| JP | 2005-219215 A | 8/2005 |
| JP | 3705482 B2 | 10/2005 |
| JP | 2005-307582 A | 11/2005 |
| JP | 2007-098755 A | 4/2007 |
| JP | 2007-216692 A | 8/2007 |
| JP | 2007-268843 A | 10/2007 |
| JP | 2008-188826 A | 8/2008 |
| JP | 2010-017963 A | 1/2010 |
| JP | 2011-110768 A | 6/2011 |
| KR | 10-0997149 B1 | 11/2010 |
| KR | 10-1439066 B1 | 9/2014 |
| NZ | 225556 A1 | 2/1992 |
| SE | 469 326 B | 6/1993 |
| WO | WO 92/06832 A1 | 4/1992 |
| WO | WO 94/00280 A1 | 1/1994 |
| WO | WO 95/06568 A1 | 3/1995 |
| WO | WO 00/22225 A1 | 4/2000 |
| WO | WO 00/44576 A1 | 8/2000 |
| WO | WO 01/00409 A1 | 1/2001 |
| WO | WO 01/64408 A1 | 9/2001 |
| WO | WO 01/68367 A1 | 9/2001 |
| WO | WO 01/92037 A2 | 12/2001 |
| WO | WO 02/42167 A2 | 5/2002 |
| WO | WO 02/42373 A1 | 5/2002 |
| WO | WO 2004/050359 A1 | 6/2004 |
| WO | WO 2004/067874 A2 | 8/2004 |
| WO | WO 2005/035209 A2 | 4/2005 |
| WO | WO 2005/035209 A3 | 4/2005 |
| WO | WO 2005/035209 B1 | 4/2005 |
| WO | WO 2005/054599 A1 | 6/2005 |
| WO | WO 2005/054600 A1 | 6/2005 |
| WO | WO 2005/066431 A2 | 7/2005 |
| WO | WO 2005/097874 A2 | 10/2005 |
| WO | WO 2005/116337 A1 | 12/2005 |
| WO | WO 2005/116361 A1 | 12/2005 |
| WO | WO 2006/007413 A1 | 1/2006 |
| WO | WO 2006/013469 A1 | 2/2006 |
| WO | WO 2006/042651 A1 | 4/2006 |
| WO | WO 2006/043893 A1 | 4/2006 |
| WO | WO 2006/126930 A1 | 11/2006 |
| WO | WO 2007/042258 A1 | 4/2007 |
| WO | WO 2007/059294 A2 | 5/2007 |
| WO | WO 2008/004960 A2 | 1/2008 |
| WO | WO 2008/004960 A3 | 1/2008 |
| WO | WO 2008/004960 A8 | 1/2008 |
| WO | WO 2008/148771 A1 | 12/2008 |
| WO | WO 2009/065768 A1 | 5/2009 |
| WO | WO 2009/065769 A2 | 5/2009 |
| WO | WO 2009/065769 A3 | 5/2009 |
| WO | WO 2009/080772 A1 | 7/2009 |
| WO | WO 2009/080813 A1 | 7/2009 |
| WO | WO 2009/116926 A1 | 9/2009 |
| WO | WO 2009/124704 A1 | 10/2009 |
| WO | WO 2010/046698 A1 | 4/2010 |
| WO | WO 2010/087752 A1 | 8/2010 |
| WO | WO 2011/058233 A1 | 5/2011 |
| WO | WO 2011/129755 A2 | 10/2011 |
| WO | WO 2011/129757 A1 | 10/2011 |
| WO | WO 2011/141851 A2 | 11/2011 |
| WO | WO 2012/004699 A2 | 1/2012 |
| WO | WO 2013/079950 A1 | 6/2013 |
| WO | WO 2013/167576 A2 | 11/2013 |
| WO | WO 2013/182191 A2 | 12/2013 |
| WO | WO 2013/182191 A3 | 12/2013 |
| WO | WO 2014/017972 A1 | 1/2014 |
| WO | WO 2014/109699 A1 | 7/2014 |
| WO | WO 2015/078434 A1 | 6/2015 |
| WO | WO 2015/105455 A1 | 7/2015 |
| WO | WO 2015/105456 A1 | 7/2015 |
| WO | WO 2015/174909 A1 | 11/2015 |

OTHER PUBLICATIONS

International Search Report dated Mar. 5, 2015 in PCT/DE2014/100398, ISA, European Patent Office, Rijswijk, NL, 2 pages.
Extended European Search Report issued in EP 19177864.6, dated Nov. 6, 2019, 9 pages, European Patent Office, Munich, DE.
Engstrand, Ola (Contact)/Valinge Innovation, Technical Disclosure entitled "Fibre Based Panels With a Wear Resistance Surface," Nov. 17, 2008, IP.com No. IPCOM000176590D, IP.com PriorArtDatabase, 76 pages.
Engstrand, Ola (Contact)/Valinge Innovation, Technical Disclosure entitled "WFF Embossing," May 15, 2009, IP.com No. IPCOM000183105D, IP.com PriorArtDatabase, 36 pgs.
Engstrand, Ola (Contact)/Valinge Innovation, Technical Disclosure entitled "VA063 VA064 Scattering and Powder Backing," Nov. 11, 2011, IP.com No. IPCOM000212422D, IP.com PriorArtDatabase, 34 pages.
BTLSR Toledo, Inc. website. http://www.btlresins.com/more.html. "Advantages to Using Powdered Resins," May 26, 2007, 2 pages, per the Internet Archive WayBackMachine.
Fang, Chang-Hua, et al., "Densification of wood veneers by compression combined with heat and steam," *Eur. J. Wood Prod.*, 2012, pp. 155-163, vol. 70, Springer-Verlag, Germany (available online Feb. 1, 2011).
Floor Daily, "Shaw Laminates: Green by Design," Aug. 13, 2007, 1 pg, Dalton, GA.
Le Fur, X., et al., "Recycling melamine-impregnated paper waste as board adhesives," published online Oct. 26, 2004, pp. 419-423, vol. 62, Springer-Verlag, DE, XP055332791.
Lstiburek, Joseph, "BSD-106: Understanding Vapor Barriers," Apr. 15, 2011, *Building Science Corporation*, pp. 1-18; (retrieved Sep. 26, 2018 https://buildingscience.com/documents/digests/bsd-106-understanding-vapor-barriers).
Mercene Labs, official home page, retrieved Feb. 23, 2017, 3 pages, retrieved from the Internet: http://www.mercenelabs.com/technology/, according to the Internet Archive WayBack Machine this page was available on Jan. 22, 2013.
Mercene Labs, "Industrial coatings," retrieved Mar. 28, 2020, 2 pages, retrieved from the Internet https://web.archive.org/web/20140825055945/http://www.mercenelabs.com/products/coating-of-difficult-substrates/ according to the Internet Archive WayBack Machine this page was available on Aug. 25, 2014 (XP055674250).
Nimz, H.H., "Wood," Ullmann's Encyclopedia of Industrial Chemistry, published online Jun. 15, 2000, pp. 453-505, vol. 39, Wiley-VCH Verlag GmbH & Co. KgaA, Weinheim, DE.
Odian, George, "Principles of Polymerization," 1991, 3$^{rd}$ Edition, 5 pages incl. pp. 122-123, John Wiley & Sons, Inc., New York, NY, USA.
Parquet International, "Digital Printing is still an expensive process," Mar. 2008, cover page/pp. 78-79, www.parkettmagazin.com.

(56) References Cited

OTHER PUBLICATIONS

Hedlund, Anette, et al., U.S. Appl. No. 16/738,334 entitled "Method to Produce a Veneer Element and a Veneer Element," filed in the U.S. Patent and Trademark Office on Jan. 9, 2020.
Bergelin, Marcus, et al., U.S. Appl. No. 17/038,567 entitled "Veneered Element and Method of Producing Such a Veneered Element," filed in the U.S. Patent and Trademark Office Sep. 30, 2020.
Schulte, Guido, U.S. Appl. No. 17/090,511 entitled "Floor, Wall, or Ceiling Panel and Method for Producing Same," filed in the U.S. Patent and Trademark Office Nov. 5, 2020.

* cited by examiner

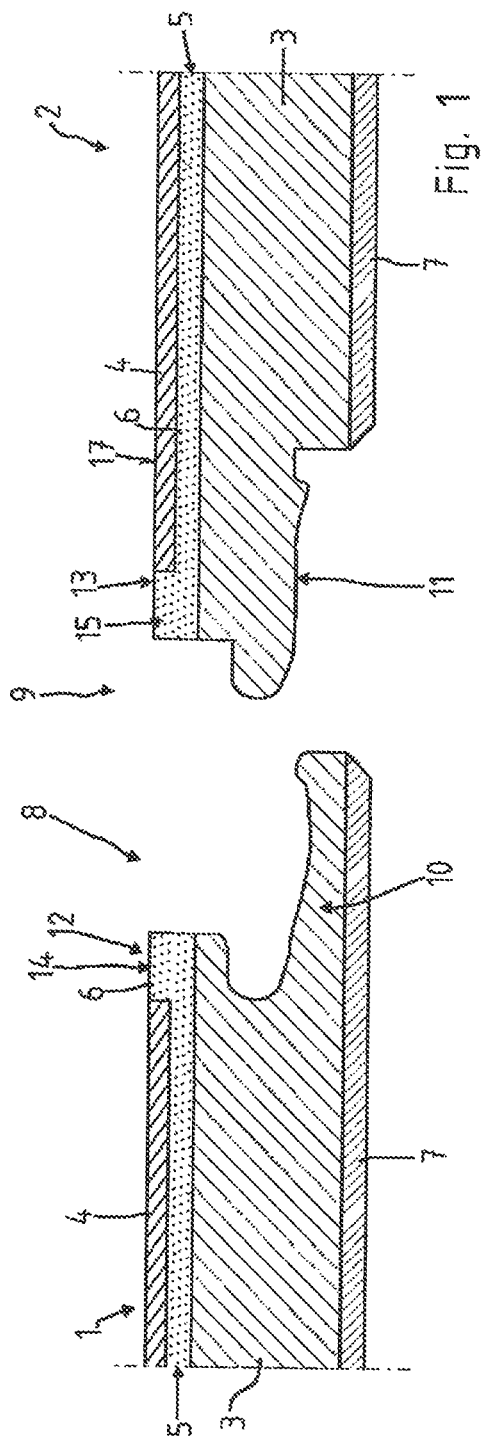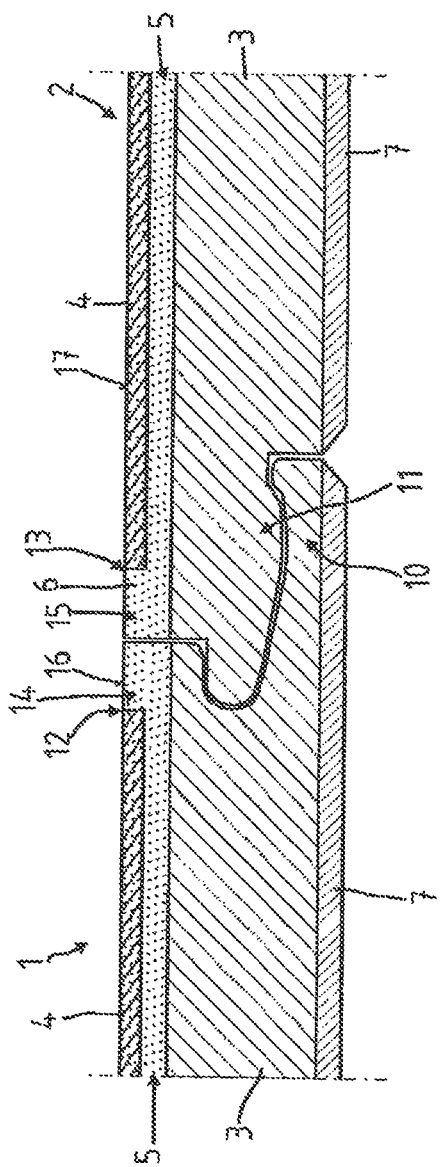

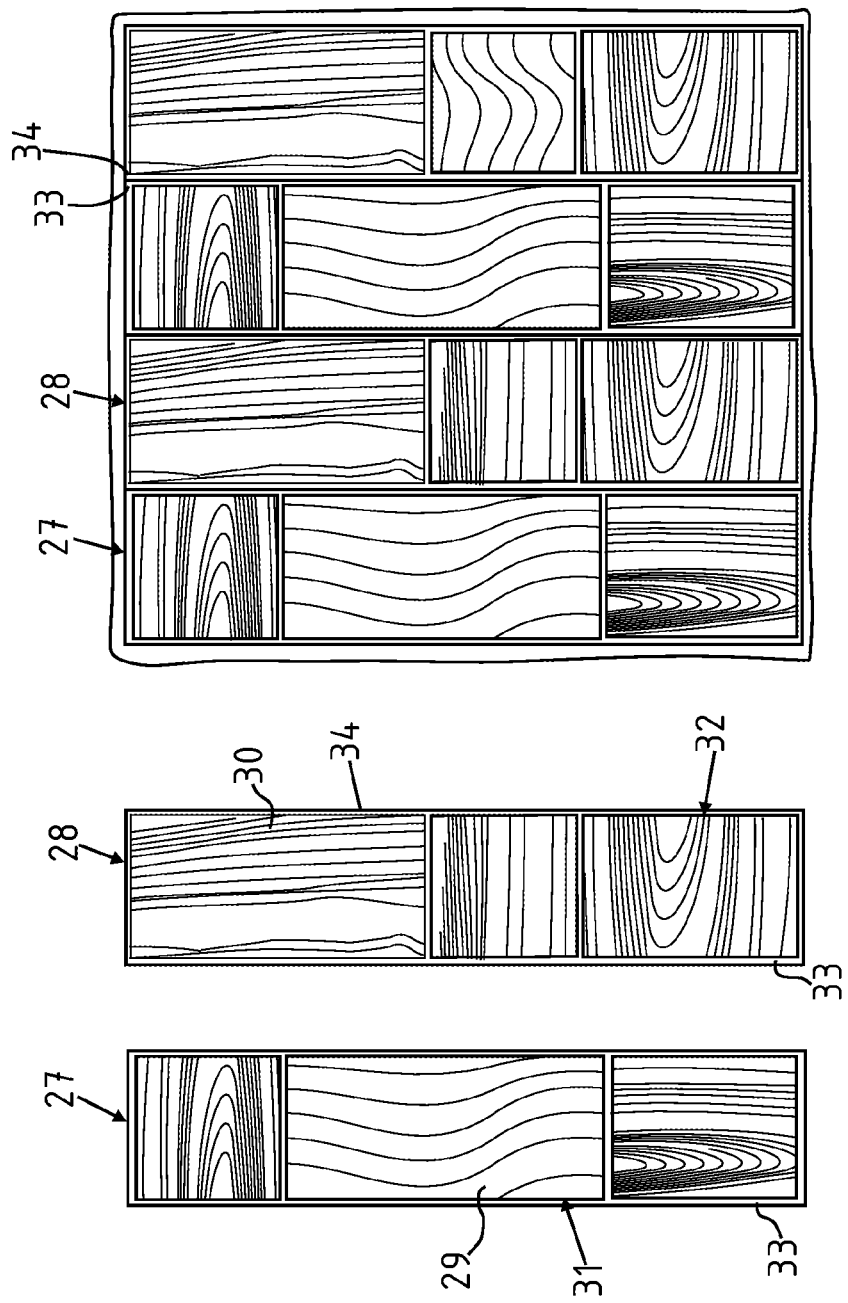

FLOORBOARD

CROSS REFERENCE TO RELATED APPLICATIONS

The present application is a continuation of U.S. application Ser. No. 15/039,504, filed on May 26, 2016, which is a U.S. national stage of International Application No. PCT/DE2014/100398, filed on Nov. 11, 2014, which claims the benefit of German Application No. 10 2013 113 109.3, filed on Nov. 27, 2013. The entire contents of each of U.S. application Ser. No. 15/039,504, International Application No. PCT/DE2014/100398, and German Application No. 10 2013 113 109.3 are hereby incorporated herein by reference in their entirety.

TECHNICAL FIELD

The invention relates to floorboard, which has a carrier plate and a veneer applied to the upper side of the carrier plate, wherein the carrier plate and the veneer are connected to each other via a resin.

Floorboards with a wear layer of genuine wood are used in particular as real wood flooring or parquet floors. A method for manufacturing parquet or floorboards with a wear layer made of real wood, designated there as a top layer, is described in DE 102 45 914 A1. The top layer of real wood is thereby subjected to impregnation with thermosetting synthetic resins and the top layer impressed.

Real wood floorboards with three-layer construction and profiled joining surfaces, the so-called click system, are well-established. This allows a mechanical connection and locking alone the abutting edges of the floorboards. The carrier plate is usually made of a high density fiberboard (HDF). The click connection is milled into the carrier plate. A wood veneer is laminated onto the carrier plate as a wear layer. The wood veneer may have different thicknesses. A thickness of the wood veneer of about 0.6 mm is called a real wood or veneer floor. The wear layer is at least 2.5 mm thick for a parquet floor.

The visible surface of floor panels with an upper side wear layer of real wood shows the naturalness and elegance of genuine wood. Accordingly, the plurality of different types of wood varies the appearance of the floorboards. Nevertheless, there is a need to enhance the appearance and possible variations of the visible surfaces of the real wood. The same applies for veneers of cork.

Preparing the veneer also requires effort. These are assembled from strips and glued or sewn to each other. In this way, one obtains a large format of the wood veneer tailored to the large format initial carrier plate. However, this preparation also requires correspondingly more effort and expense in manufacturing.

Furthermore, the wood veneers, but also cork veneers, are often amply trimmed on the side in order to tidy these up and ensure a straight side margin profile. This leads to a corresponding cutting scrap. A greater conservation of resources is desirable against this backdrop.

Furthermore, it should be noted that the edge region is particularly stressed along the side margins of the veneer. Problems can arise in the edge region, especially when using of wood veneers made from types of softwoods, both in the machining of the panels in the course of further production steps such as brushing or grinding or by abrasion during the course of intended use in a floor surface.

The object of the invention is, starting from the prior art, to create a floorboard with an upper side veneer which is improved in terms of costs and production and application technology and has a striking appearance.

This object is solved according to the invention by a floorboard according to claim 1.

Advantageous embodiments of the floorboard according to the invention are the subject of the dependent claims 2 to 8.

The present invention particularly relates to floorboards with a thickness of the wood veneer of less than 2.5 mm, in particular with a thickness between 0.6 mm and 1.2 mm. Also, the veneer may be a cork veneer, in particular, a cork oak veneer.

The floorboard according to the invention has a carrier plate with an upper side veneer. The carrier plate is a plate material made of a wood material such as solid wood, chipboard, wood-fiber material, MDF (medium density fiberboard) or HDF (high density fiberboard). In practice, the carrier plate in particular is made of HDF. Also carrier plates made of different materials or material mixtures are suitable for practice. Carrier plates made of waterproof materials can be used, for example, based on mineral materials such as fiber cement sand-binding mixtures or wood-plastic composites (WPC) and wood fiber-polymer composites. Magnesite plates are also suitable. One aspect is also directed here to the use of natural fiber-reinforced plastic as a material for the carrier plate or the initial carrier plate. Besides wood fibers, other plant fibers such as jute or flax can be used. A natural fiber or natural flour component of 50% to 90% in a plastic matrix is preferably made of polypropylene (PP) comes to bear here. Further, a wood-plastic composite material based on thermoplastic processed thermosets like modified melamine resin with natural fibers or natural flour component can be used. An interesting approach for the practice also offers a bamboo plastic composite (BPC). Bamboo fiber and bamboo flour can be used as a natural material for this material.

As already mentioned, plates based on cementitious binders or fiber cement sheets can be used as carrier plates as well as magnesite plates. Magnesite plates consist of a mixture of magnesium oxide, calcium carbonate, silicates, as well as fibers, particularly wood and/or glass fibers. An advantage of magnesite plates is the weight and the low heat conductivity as well as its fire resistance. Magnesite plates are classified as non-combustible.

The carrier plate may also be made of elastic materials, such as fleece or woven materials or based on cellulose. In this context, relatively thin carrier plates with a thickness between 1 mm and 6 mm can be used.

The carrier plate and the veneer are thermally pressed together and bonded inseparably via a resin. According to the invention, an edge strip is provided on at least two side margins of the veneer. This edge strip is made of resin. An edge strip of resin is preferably configured circumferentially around the veneer on all sides.

Preferably, the edge strip differs visually from the veneer. One can therefore distinguish the edge strips significantly from veneer, however, the edge strip is matched visually to the veneer. The edge strip has the basic color of the veneer but is of uniform hue. A variance in the optical design of a floorboard results if a resin whose color contrasts with the color of the veneer is used. For example, a groove design can be specifically generated through this. A visual emphasis of the surface of a floorboard is possible through the interplay of resin and veneer. Effect materials such as pigments and other fillers can also be used in the resin for this. An effect material may be, for example, mica. Even fluorescent pigments are possible as an effect material.

The veneer dimensions are smaller than the carrier plate. Consequently, the veneer does not fully cover the carrier plate. This thereby results in edge strips on at least two side margins of the veneer which are formed by resin. The surface of the edge strips extends into the plane of the surface of the veneer. The resin fills the edge strips and equalizes the surface to the surface of the veneer.

One aspect of the invention provides that the veneer has uneven side margins, in particular, the side margins may be untrimmed. An otherwise common cutting scrap is eliminated. This leads to a better utilization of the available raw material and resource conservation.

The starting product in the manufacture of floorboards according to the invention is a large-surface initial carrier plate. The initial carrier plate is rectangularly configured and has a size of 2,000 mm to 5,600 mm in length and 1,200 mm to 2,100 mm in width. Usually, the carrier plate or the initial carrier plate has a thickness of 4.5 mm to 12 mm.

The veneers are placed as strips or sheets on a large-format initial carrier plate. The individual strips or sheets of wood veneer arranged on the initial carrier plate are laid with distances to one another such that a gap exists between the individual veneers. The resin is incorporated between initial carrier plate and the veneers. In particular, this is a thermosetting synthetic resin. Color or transparent melamine resins or melamine/polyurethane resin mixtures can be applied. The resin may be present on a paper-like carrier in the form of a paper impregnation, also called resin paper. The resin or resin layer may further be present or configured as a resin film. A resin layer may be formed by a resin film applied on the upper side of the carrier plate. Also, a resin layer may be formed on the under side of the veneers in the form of a resin film. In both cases, the resin is applied onto the carrier plate or the veneer in liquid form and dried or pre-condensed. When a coating of resin is applied to the veneer, the wood veneer is impregnated with resin. The amount of resin is measured such that a reliable bond is created between the initial carrier plate and the veneers and the gap is filled and equalized between the veneers.

The resin used according to the invention, in particular, is a thermosetting synthetic resin. One aspect of the invention aims to use resins which react and cure under heat and pressure. In this connection, the use of aminoplastic, thermosetting or reactive resins such as polyurethane (PU) or thermoplastic polyurethane is offered.

During manufacturing, the initial carrier plate, the resin and the veneers are pressed together and joined together. The veneer thereby is infiltrated by the resin, preferably completely saturated. The grouting takes place hot at a temperature of over 100° C., in particular more than 120° C., preferably at a temperature between 180° C. and 210° C. The pressing temperature refers to the temperature at the press plate of the press. This temperature is also present on the contact surfaces of the pressing plate with the upper side of the veneer or the under side of the carrier plate.

A balancing layer is provided at the under side of the carrier plate. This balancing layer is joined to the under side of the carrier plate during the pressing process. To do this, the balancing layer is positioned on the under side of the initial carrier plate for the formation of the multilayer body made of initial carrier plate, resin and veneers. The grouting of the multilayer body is carried out in a press, and actually at a pressure of greater than or equal (≥) 1,000 kilopascals (kPa). Preferably, the pressing pressure is above 3,500 kilopascals (kPa). The pressing temperature is greater than or equal to (≥) 100° C., preferably the pressing temperature is between 180° C. and 210° C. The pressing time, when pressure in the press is applied to the multilayer body, is between 10 seconds and 60 seconds.

During the pressing process, the surface of the veneers can receive a structure, a pattern or ornaments by a structure sheet or a texturing agent. The structure may vary in gloss level in sub-areas. In addition, various structure depths are possible. The structure depth may be up to 0.6 mm. In relation to the veneer thickness, the structure may have a structure depth of ⅔ of the veneer thickness.

After the pressing process, the pressed multilayer body is cooled and divided into individual boards. As already stated, the resin fills the gap between adjacent veneers and equalizes the surface. The division of the compressed large format multilayer body into individual boards occurs along or in the area of the gap between two adjacent mutually arranged veneers. Accordingly, the width of the individual veneers is matched to the width of a divided individual board. The individual boards are profiled at their side margins in a subsequent work step. The profiling is used in particular for the formation of connecting means such as groove and spring or click connections on the long and short sides of the boards. Folds can also be formed. Since the side margin portions of the boards are stabilized by the resin, a mechanical processing of the side margins is advantageously possible. In particular, a fraying of the upper side wear layer of veneer can be prevented.

The edge strip of resin is completely or partially obtained in the course of mechanical machining of the side margins of a board.

During the pressing process, the resin is plasticized under the influence of temperature and saturates or infiltrates into the wood veneer. Preferably, the resin saturates the wood veneer completely up to the upper side of the wood veneer. Existing pores, cracks, splits and/or flaws in the wood veneer are filled with resin during the pressing process. The resin forms an inseparable connection between the veneer and the carrier plate. Another advantage of the invention is therefore that two production steps, namely the bonding and smoothing the wood veneer, can be performed together in one work operation.

In particular, the grouting of the multilayer body is carried out such that the veneer is soaked with resin and is visible after grouting the resin on the surface of the veneer. In this context, color coordinated resins are used in particular for the color of the veneer. Technically, a black resin is universally applicable and advantageous. Advantageously, the grouting is performed such that the surface of the veneer and thus of the board is contaminated by very little or no resin. Pores, cracks, crevices and other flaws are visibly filled. However, there is no or at least very little excess resin on the surface. The grouted product then only needs to be structure brushed and possibly receives a surface oiling or varnish.

The resin may contain a filler or be thickened with a filler. More mass is thereby available to fill pores, cracks, crevices and/or flaws. Organic or inorganic materials may be used as a filler, in particular, mineral pigments or powder, as well as wood powder or wood flour.

The surface of the floorboard or the surface of the veneer and the surface of the side margins are subjected to a mechanical surface treatment after the grouting. A grinding or brushing of the surface in particular takes place in the context of the surface treatment. Also, the surface can be mechanically embossed and structured. Since the upper side veneer is impregnated by the resin, resistance, especially the resistance to indentation and wear-through resistance, is also increased. The high resistance is advantageous in a mechanical processing of the wood veneer. The impregnation of the veneer with resin also allows the use of softer veneers, especially wood veneers made of woods such as larch or coarsely porous woods.

Furthermore, a sealing of the surface is possible, for example, by the application of a color, a stain, an oil or a varnish or varnish system. In this context, the surface may be printed with a decoration.

Figure 3B:
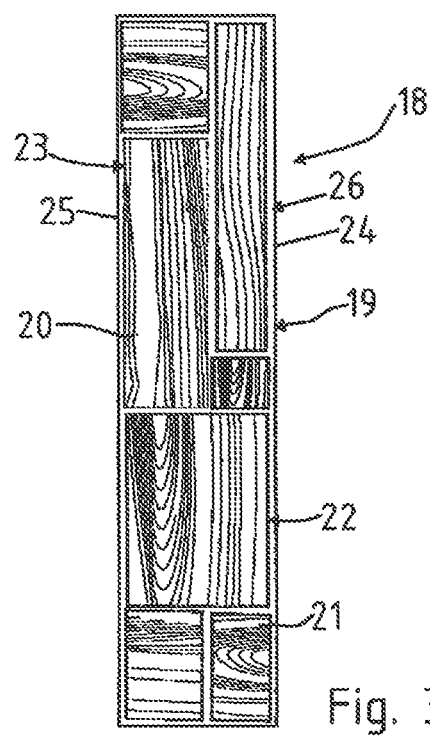

The invention is described below with reference to drawings. It shows:

FIG. 1 in an enlarged view, the region of the longitudinal side of two adjacent floorboards with corresponding locking means;

FIG. 2 a section made of two floorboards coupled to each other;

FIG. 3a schematically a plan view of a floor covering made of floorboards according to the invention;

FIG. 3b a plan view for a floorboard according to the invention and

FIG. 3c two individual floorboards and a section of a floor covering formed from the floorboards also in plan view.

FIGS. 1 and 2 illustrate schematically the construction of floorboards 1 and 2 according to the invention in their vertical plane. The figures, in particular as regards the thickness of the individual layers, are not to scale.

Each floorboard 1, 2 has a carrier plate 3, on whose upper side a veneer, namely a wood veneer 4, is applied. The carrier plate 3 and the wood veneer 4 are fully pressed and bonded together via a resin layer 5 made of resin 6. A balancing layer 7 is provided on the under side of the carrier plate 3. Locking strips 10, 11 are provided on the longitudinal sides 8, 9 of the floorboards 1, 2. For adjacent floorboards 1, 2 in a floor covering, the respective corresponding locking strips 10, 11 engage with each other. In FIG. 1 as well as in FIG. 2, the locking strips 10, 11 are shown at two longitudinal sides 8, 9 with respect to each other of a floorboard 1, 2. The floorboards 1, 2 also have locking means at their respective head sides, which however, are not to be seen here.

The carrier plate 3 and the upper side wood veneer 4 and the carrier plate 3 and the under side balancing layer 7 are thermally pressed against each other and bonded together inseparably. The bonding between the carrier plate 3 and wood veneer 4 is accomplished via the incorporated resin 6. The balancing layer 7 is also bonded to the carrier plate 3 via a resin.

An edge strip 14, 15 is configured on at least two side margins 12, 13 of the wood veneer 4 on the upper side of the floorboards 1, 2. These edge strips 14, 15 are made of resin 6. The surface 16 of the edge strip 14, 15 extends into the plane of the surface 17 of the wood veneer 4.

The resin 6 is plasticized during grouting of the resin 6 (resin layer, resin film) provided between each of carrier plate 3, wood veneer 4, balancing layer 7. The resin 6 provided on the upper side between the carrier plate 3 and wood veneer 4 infiltrates the wood veneer 4. The resin 6 can thereby saturate the wood veneer 4 to the surface 17 of the wood veneer 4. This is illustrated in FIG. 2.

Pores, cracks, crevices and/or flaws present in the wood veneer 4 are filled with resin 6 during grouting. The bonding of the wood veneer 4 with the carrier plate 3, and the filling of the surface 17 of the wood veneer 4 occurs together in a single work operation during the grouting of the multilayer body.

FIG. 3 shows an exemplary represented section from a floor covering formed from floorboards 1, 2 according to the invention in plan view. The floorboards 1, 2 are coupled to a floor covering. The side margins 12, 13 of the wood veneers 4 each have circumferentially an outer strip 14, 15 formed from resin 6. Pores, cracks, gaps and/or flaws such as knotholes in the wood veneers 4 are filled with resin 6. The surface 17 of the wood veneer 4 can be stained in color after grouting or printed with decorations or patterns. A protective layer or sealing, for example, of a transparent varnish, floor oil or similar is subsequently applied. Furthermore, it is possible to print or varnish in color the edges or side margins of the floorboard, which are made of hard high-strength resin material.

FIG. 3b shows a floorboard 18. This has a carrier plate 19 and a number of wood veneers 20, 21 on the upper side. As described above, the carrier plate 19 and the wood veneers 20, 21 are thermally grouted together. Edge strips 24, 25 which consist of resin 26 are configured along the side margins 22, 23 of the wood veneers 20, 21. It can be seen that the surface of the floorboard 18 has an uneven character based on the geometrically variously formed and arranged wood veneers 20, 21.

FIG. 3c shows two individual floorboards 27, 28 and a section of a floor covering formed from floorboards 27, 28. The construction of the floorboards 27, 28 is as previously described. The floorboards 27, 28 have wood veneers 29, 30 on the upper side. Edge strips 33, 34 are configured from high strength resin material each circumferential to the side margins 31, 32. Basically, the wood veneers 29, 30 may be arranged regularly but also irregularly.

REFERENCE SIGNS

1—Floorboard
2—Floorboard
3—Carrier plate
4—Wood veneer
5—Resin layer
6—Resin
7—Balancing layer
8—Longitudinal side
9—Longitudinal side
10—Locking bar
11—Locking bar
12—Margin
13—Margin
14—Edge strips
15—Edge strips
16—Surface
17—Surface
18—Floorboard
19—Carrier plate
20—Wood veneer
21—Wood veneer
22—Margin of 20
23—Margin of 21
24—Edge strips
25—Edge strips
26—Resin
27—Floorboard
28—Floorboard
29—Wood veneer
30—Wood veneer
31—Margin
32—Margin
33—Edge strips
34—Edge strips

The invention claimed is:

1. A floorboard, comprising:
a carrier plate and at least two veneers arranged on a topside of the carrier plate, the carrier plate and the at least two veneers being connected with each other via a resin layer,
wherein an edge strip made of the resin layer is provided at least between the at least two veneers,
wherein a top surface of the edge strip and a top surface of the at least two veneers are coplanar, and
wherein the resin layer forms a continuous layer on the topside of the carrier plate in contact with a bottom surface of the at least two veneers to connect the carrier plate to the at least two veneers, the continuous layer of the resin layer on the topside of the carrier plate including the edge strip of the resin layer.

2. The floorboard of claim 1, wherein the edge strip differs visually from the at least two veneers.

3. The floorboard of claim 1, further comprising a balancing layer provided on an under side of the carrier plate.

4. The floorboard of claim 1, wherein the resin layer comprises a filler.

5. The floorboard of claim 1, wherein the at least two veneers are impregnated by the resin of the resin layer.

6. The floorboard of claim 1, wherein the carrier plate is a wood board.

7. The floorboard of claim 1, wherein the surface of the at least two veneers and/or the surface of the edge strip is at least one of burnished, embossed, brushed and sealed.

8. A floorboard, comprising:
a carrier plate and at least two veneers arranged on a topside of the carrier plate, the carrier plate and the at least two veneers being connected with each other via a resin layer,
wherein an edge strip made of the resin layer is provided at least between the at least two veneers,
wherein the resin layer forms a continuous layer on the topside of the carrier plate in contact with a bottom surface of the at least two veneers to connect the carrier plate to the at least two veneers, the continuous layer of the resin layer on the topside of the carrier plate including the edge strip of the resin layer, and
wherein the at least two veneers are impregnated by the resin of the resin layer.

9. The floorboard of claim 8, wherein the edge strip differs visually from the at least two veneers.

10. The floorboard of claim 8, further comprising a balancing layer provided on an under side of the carrier plate.

11. The floorboard of claim 8, wherein the resin layer comprises a filler.

12. The floorboard of claim 8, wherein the carrier plate is a wood board.

13. The floorboard of claim 8, wherein the surface of the at least two veneers and/or the surface of the edge strip is at least one of burnished, embossed, brushed and sealed.

14. A floorboard, comprising:
a carrier plate and a number of veneers arranged on a topside of the carrier plate, the carrier plate and the number of veneers being connected with each other via a resin layer,
wherein an edge strip made of the resin layer is provided at least between adjacent veneers, and
wherein the resin layer forms a continuous layer on the topside of the carrier plate in contact with a bottom surface of the number of veneers to connect the carrier plate to the number of veneers, the continuous layer of the resin layer on the topside of the carrier plate including the edge strip of the resin layer.

15. The floorboard of claim 14, wherein the edge strip differs visually from the number of veneers.

16. The floorboard of claim 14, further comprising a balancing layer provided on an under side of the carrier plate.

17. The floorboard of claim 14, wherein the resin layer comprises a filler.

18. The floorboard of claim 14, wherein the number of veneers are impregnated by the resin of the resin layer.

19. The floorboard of claim 14, wherein the carrier plate is a wood board.

20. The floorboard of claim 14, wherein the surface of the number of veneers and/or the surface of the edge strip is at least one of burnished, embossed, brushed and sealed.

* * * * *